May 22, 1928.  1,670,486

P. TÄTZ
METHOD AND ARRANGEMENT FOR SPARK TELEGRAPHY
OVER HIGH TENSION LINES OR CABLES
Filed Nov. 6, 1925

INVENTOR
PAUL TÄTZ
BY
ATTORNEY

Patented May 22, 1928.

1,670,486

UNITED STATES PATENT OFFICE.

PAUL TÄTZ, OF BERLIN, GERMANY, ASSIGNOR TO GESELLSCHAFT FUR DRAHTLOSE TELEGRAPHIE M. B. H., OF BERLIN, GERMANY, A CORPORATION OF GERMANY.

METHOD AND ARRANGEMENT FOR SPARK TELEGRAPHY OVER HIGH-TENSION LINES OR CABLES.

Application filed November 6, 1925, Serial No. 67,202, and in Germany November 8, 1924.

The object of this invention is to provide means whereby the normal working voltage of a signaling system can be utilized for the artificial production of a secondary wave train series.

Another object is to provide means whereby signals may be sent and received through the medium of a secondary wave train produced by means of a spark gap joined to the transmitting circuit through impedance.

A further object of the invention is to provide a method and means of the character referred to whereby a receiving circuit can be united to the transmitting circuit through high impedance and a spark gap whereby the voltage impulses incidently to the impact of transmitted oscillations can be induced into an aperiodic circuit in which an indicating means is inserted by means of which signals can be read.

Other objects of the invention will appear as set forth more fully hereinafter, reference being made to the drawing wherein, Fig. 1 is a diagrammatic plan of a circuit showing the use of high potential condensers joined to a spark gap.

Figure 1:
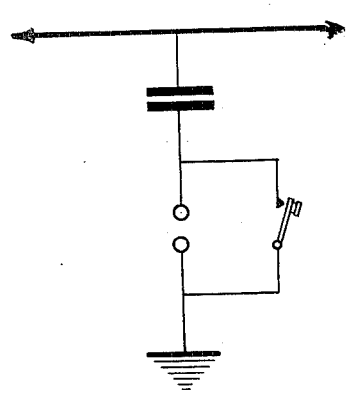
Figure 2:
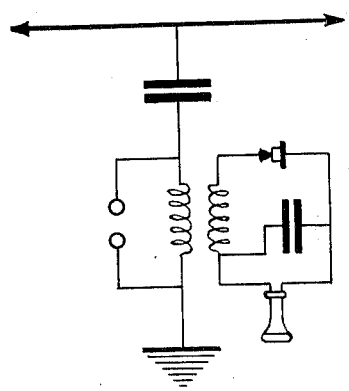
Fig. 2 shows an arrangement wherein a receiving circuit is inserted, the receiving circuit being operated by the oscillations induced in the spark gap circuit.
Figure 3:
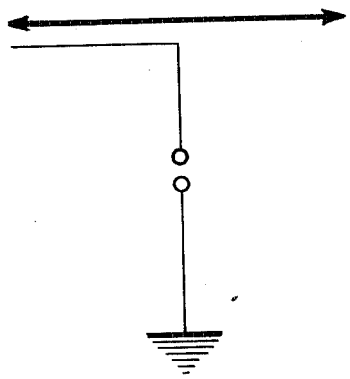
Fig. 3 shows another arrangement wherein condensers are replaced by impedances in the form of wires parallel to and insulated from the aerial wire.

It is well-known that in the case of accidental grounds in high potential lines oscillations are propagated from the faulty points in all directions.

In high tension lines it is often noted that sparks frequently pass between individual defective insulating units or elements. These flashovers constitute slight accidental grounds of the high tension line in view of the capacity of the insulating units. Transmitting waves in this manner are set up on the aerial circuit which inside of a given time interval succeed one another at half the period of the operating frequency. These transmitted waves can be perceived through indicating devices which are coupled in the well-known manner to the aerial.

In conformity with the invention, at the point where signals are to be sent out, a spark gap would be joined to the line through apparent resistances (impedances), and these impedances preferably could consist of high potential condensers.

It is obvious that in lieu of the condensers other types of impedances could be employed. The high tension condensers in the case of an aerial could be replaced by aerial wires mounted parallel to the line at a small distance from said line, the capacity of this wire with reference to the aerial then constituting the requisite impedance. By connecting and disconnecting the spark-gap at any desired rhythm, for instance, at the rhythm of the Morse-code signals, the transmitted waves thus set up produce signals which could be carried over the high tension line to the other end. Also the receiver could be united with the aerial circuit through high impedance. Instead of auditive reception, recourse could also be had to inking reception or to the releasing of any other signals by the use of well-known means for this purpose. A very simple calling device could be employed in which a spark-gap could be used at the receiving end, said spark gap being bridged by means of a choke coil. The latter serves the object of preventing the potential set up by the working voltage from increasing unduly across the spark-gap in order that the same may not be caused to flash when in idle or inoperative condition. But upon the impact of received waves, the potential set up at the choke coil will be of sufficient value to operate the spark-gap. By reason of the spark-gap becoming conductive it can be made use of in the well-known manner for calling purposes and signaling work.

Having now set forth the objects and nature of my invention what I claim is new and useful and desire to secure by Letters Patent is,—

1. In a signalling system for spark telegraphy over high potential lines and cables, a receiving circuit and a transmitting circuit coupled thru a high impedance, a spark gap in the transmitting circuit and means controlled by said spark gap whereby the normal working voltage of said high potential line can be utilized for the artificial production of a secondary wave train series for inducing transmitted oscillation into the receiving circuit, whereby signals may be interpreted.

2. In a signalling system for spark telegraphy over high potential lines and cables, means using the high potential lines as an aerial means controlled by a spark-gap for utilizing the normal working voltage of said high potential line for producing artificially excited electrical oscillations and a receiver connected to the line thru resistances constituting high impedances for the frequency of the high potential said impedances comprising wires parallel to and insulated from the aerial wire.

PAUL TÄTZ.